(12) United States Patent
Kolis et al.

(10) Patent No.: US 6,290,131 B1
(45) Date of Patent: Sep. 18, 2001

(54) OPTICAL SCANNER ADAPTED FOR DIRECT INTERFACING TO A DATA COMMUNICATIONS NETWORK

(75) Inventors: George Kolis, Pennsauken; John Furlong, Woodbury, both of NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 09/310,811

(22) Filed: May 12, 1999

(51) Int. Cl.[7] ...................................................... G06K 7/10
(52) U.S. Cl. .................................. 235/462.01; 235/462.15
(58) Field of Search .................................. 235/375, 454, 235/462.01, 462.15, 472.01, 472.02, 472.03; 705/1, 23, 21

(56) References Cited

U.S. PATENT DOCUMENTS

| 4,894,522 | | 1/1990 | Elliott . | |
|---|---|---|---|---|
| 5,029,183 | * | 7/1991 | Tymes | 375/141 |
| 5,258,604 | | 11/1993 | Behrens et al. . | |
| 5,708,680 | * | 1/1998 | Gollnick et al. | 235/472.02 |
| 5,710,416 | | 1/1998 | Belknap et al. . | |

FOREIGN PATENT DOCUMENTS

DE 42 21 410
A1    1/1994   (DE) .

OTHER PUBLICATIONS

"3–Wire RS–232 to RS–485 Converter" by W. Stepthen Woodward, Electronic Design, Penton Publishing, vol. 44 No. 12, Jun. 12, 1996, PG106–108.

W. Stephen Woodward, 3–Wire RS–232 to RS–485 Converter; Electronic Design, US, Penton Publishing, Cleveland, OH, vol. 44, No. 12, Jun. 10, 1996 p. 106, 108 XP000620137; ISSN: 0013–4872, the whole document.

* cited by examiner

Primary Examiner—Karl D. Frech
Assistant Examiner—Larry D Taylor
(74) Attorney, Agent, or Firm—Hopgood, Calimafde, Judlowe & Mondolino

(57) ABSTRACT

An enhanced scanner is equipped with a novel interfacing mechanism for communicating directly with a data communications network. This eliminates the requirement of using intelligent network interface devices to access data generated by any of a plurality of bar code scanners coupled to a communications network. This novel interfacing mechanism may include a program stored on a memory device within the scanner and executed by a scanner processing mechanism. The scanner processing mechanism is adapted to perform two functions—bar code scanning and network communications—thereby reducing the cost and complexity of a communications network that includes one or more bar code scanners coupled to a host device through the network.

5 Claims, 14 Drawing Sheets

FIG. 6

| MSB | – | – | – | – | – | – | LSB |
|---|---|---|---|---|---|---|---|
| 7 | 6 | 5 | 4 | 3 | 2 | 1 | 0 |
| C | F | F | A | A | A | A | A |
| 601 | 603 | 605 | 607 | 609 | 611 | 613 | 615 |

BIT NUMBER →

BIT ID →

C = CONTROLLER FLAG:
    SET TO 1 DURING A CONTROLLER TRANSMISSION TO THE NETWORK.
    SET TO 0 FOR SCANNER REPLIES AND DURING SCANNER DATA TRANSMISSION.

F = FUNCTION (CONTROLLER COMMAND OR SCANNER REPLY)
    CONTROLLER COMMANDS:
    BIT NUMBER 6 – 5
                0 – 0 = RESET ADDRESSED SCANNER
                0 – 1 = ACK DATA FROM ADDRESSED SCANNER (DATA RECEIVED OK)
                1 – 0 = NAK DATA FROM ADDRESSED SCANNER (DATA RECEPTION NG)
                1 – 1 = POLL ADDRESSED SCANNER FOR DATA
    SCANNER REPLIES:
    BIT NUMBER 6 – 5
                0 – 0 = RESERVED
                0 – 1 = SCANNER HAS DATA AVAILABLE
                1 – 0 = SCANNER HAS NO DATA AVAILABLE
                1 – 1 = SCANNER RESET ACKNOWLEDGMENT (RESET ACK)

A = NETWORK ADDRESS IN BINARY (32 TOTAL)
    LEAST SIGNIFICANT BIT = BIT 0
    MOST SIGNIFICANT BIT = BIT 4
    ADDRESS 0 = RESERVED

OPTICAL SCANNER ADAPTED FOR DIRECT INTERFACING TO A DATA COMMUNICATIONS NETWORK

FIELD OF THE INVENTION

This invention relates generally to optical scanners and, more particularly, to devices and methods by which optical scanners communicate over data networks.

BACKGROUND ART

Various data communications networks have been developed to link together a plurality of bar code scanners, so as to permit these scanners to communicate with a host device through a single communications port. In this manner, data generated by any of the bar code scanners may be retrieved at the host device. An example of a typical prior art data communications network is shown in FIG. 1. For purposes of illustration, the hardware configuration of FIG. 1 uses several different types of scanners, including a slot scanner 123, a hand scanner 125, and a counter scanner 127. Each of these scanners is powered by a corresponding power supply 117, 119, 121, respectively.

Each scanner is connected to a corresponding network communication device which allows the scanner to transfer its data to the network in an orderly and controlled manner. Slot scanner 123 is connected to network communication device 103, hand scanner 125 is connected to network communication device 105, and counter scanner 127 is connected to network communication device 107. Network communication device 103 is powered by power supply 111, network communication device 105 is powered by power supply 113, and network communication device 107 is powered by power supply 115. Communication devices 103, 105, and 107 are coupled through network wiring to a network controller 101 which manages communications on the network and initiates the uploading of data from all of the scanners 123, 125, 127 via corresponding network communication devices 103, 105, 107. The network controller 101 sends accumulated uploaded data to the host device. This accumulated data may be sent to the host device using any of a plurality of known data formats, and using any of a plurality of known data transmission methods, depending upon the specifics of a given system application. Network controller 101 is powered by power supply 109.

In the configuration of FIG. 1, each network communication device is designed to operate independently of the scanner to which it is connected. Thus, network communication device 103 is equipped to operate independently of slot scanner 123, network communication device 105 is equipped to operate independently of hand scanner 125, and network communication device 107 is equipped to operate independently of counter scanner 127. This independent operation makes it necessary to utilize separate power supplies 117, 119, 121 for each of the scanners, as well as separate power supplies 111, 113, 115 for each of the network communication devices. More importantly, however, it is necessary to provide each network communication device 103, 105, 107 with some type of a processing mechanism, such as a microprocessor and any associated program and data memory devices required to manage communications between a respective scanner 123, 125, 127 and its corresponding network communications device 103, 105, 107.

The use of "intelligent" network communications devices, each having separate power supplies and separate processing mechanisms, adds unnecessary expense and complexity to network communication devices 103, 105, 107. By way of example, refer to FIG. 2A which is a hardware block diagram setting forth an illustrative network communication device 203 for interfacing a scanner 201 with a communications network. Scanner 201 includes a photocell 205 coupled to a signal processor 207. Signal processor 207 amplifies, filters, and processes the output of the photocell 205 so that the processed signal is in a form suitable for digitization by digitizer 209. The digitized signals are sent to a scanner processing mechanism that includes a microcontroller 215, program memory 211, data memory 213, and a communications interface 217.

The communications interface 217 of scanner 201 is connected to another communications interface 225 in the network communication device 203. Network communication device 203 also includes a microcontroller 223, program memory 219, and data memory 221. Both the network communication device 203 and the scanner 201 are "intelligent" in the sense that both contain processing mechanisms. Such a hardware configuration is inherently inefficient, because it requires the use of two separate microcontrollers 215, 223, two separate program memories 211, 219, and two separate data memories 213, 221. Moreover, the use of multiple processing mechanisms, such as microcontrollers 215, 223, adds significantly to the cost and complexity of the overall system.

SUMMARY OF THE INVENTION

My invention eliminates the requirement of using intelligent network interface devices to access data generated by any of a plurality of bar code scanners coupled to a communications network. This objective is accomplished by using an enhanced scanner equipped with a novel interfacing mechanism for communicating directly with the communications network. In accordance with a preferred embodiment of the invention, this interfacing mechanism includes one or more programs stored on a memory device within the scanner and executed by a scanner processing mechanism. The scanner processing mechanism is adapted to perform two functions—bar code scanning and network communications—thereby reducing the cost and complexity of a communications network that includes one or more bar code scanners coupled to a host device through the network.

BRIEF DESCRIPTION OF THE DRAWINGS

FIG. 6 is a data structure diagram representing a command sent to, or a reply received from, a scanner.

DETAILED DESCRIPTION OF THE PREFERRED EMBODIMENTS

As will be described in greater detail hereinafter, my invention eliminates the requirement of using "intelligent" network communications interface devices to access data generated by any of a plurality of scanners coupled to a communications network. Basically, an enhanced scanner is equipped with a novel interfacing mechanism for communicating directly with the communications network. The network communications interface devices need not contain any "intelligence", which is to say that they need not contain any processing mechanism. By way of example, the novel interfacing mechanism may include a program stored on a memory device within the scanner and executed by a scanner processing mechanism. The scanner processing mechanism is called upon to perform two functions: bar code scanning and network communications. This significantly reduces the cost and complexity of a network that includes one or more bar code scanners.

Figure 1:
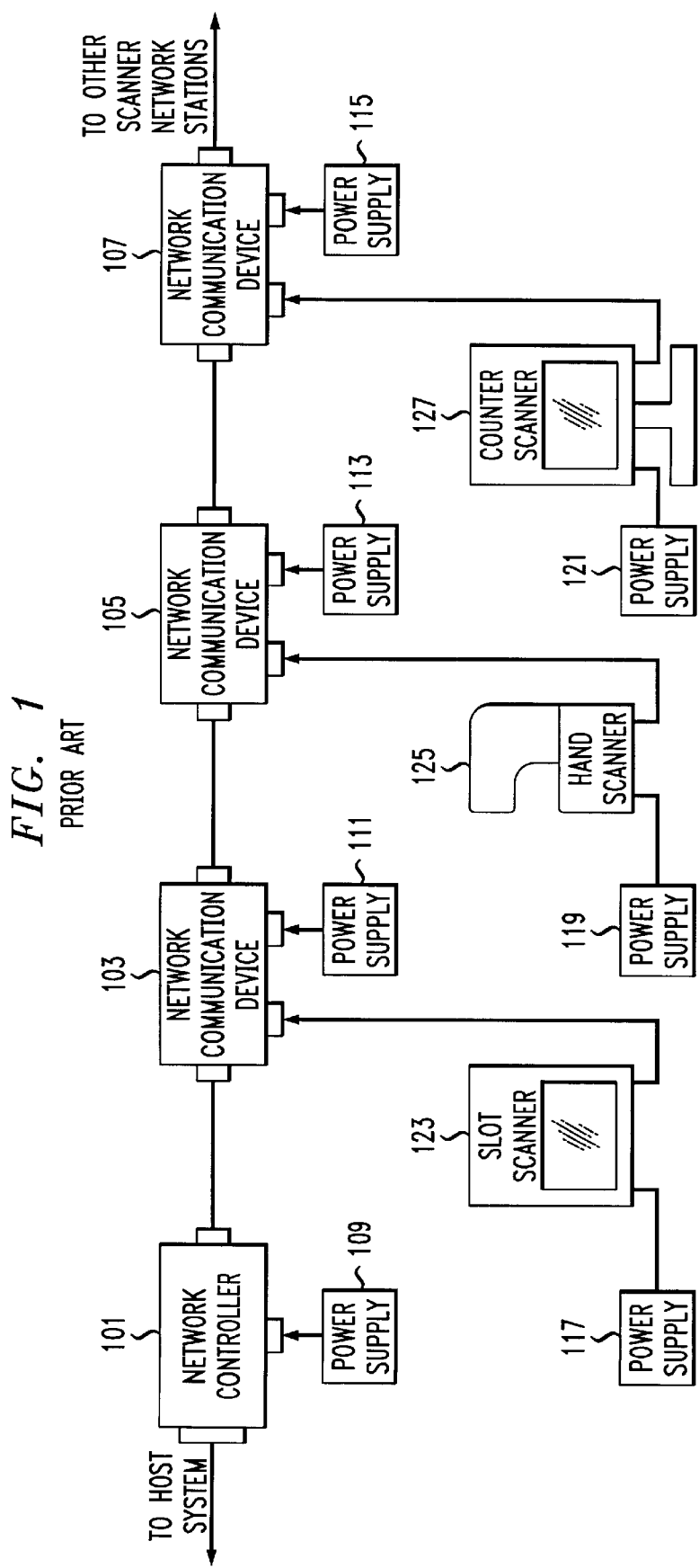
FIG. 1 is a hardware block diagram showing a prior art communications network equipped to collect data from a plurality of scanners.
Figure 2A:
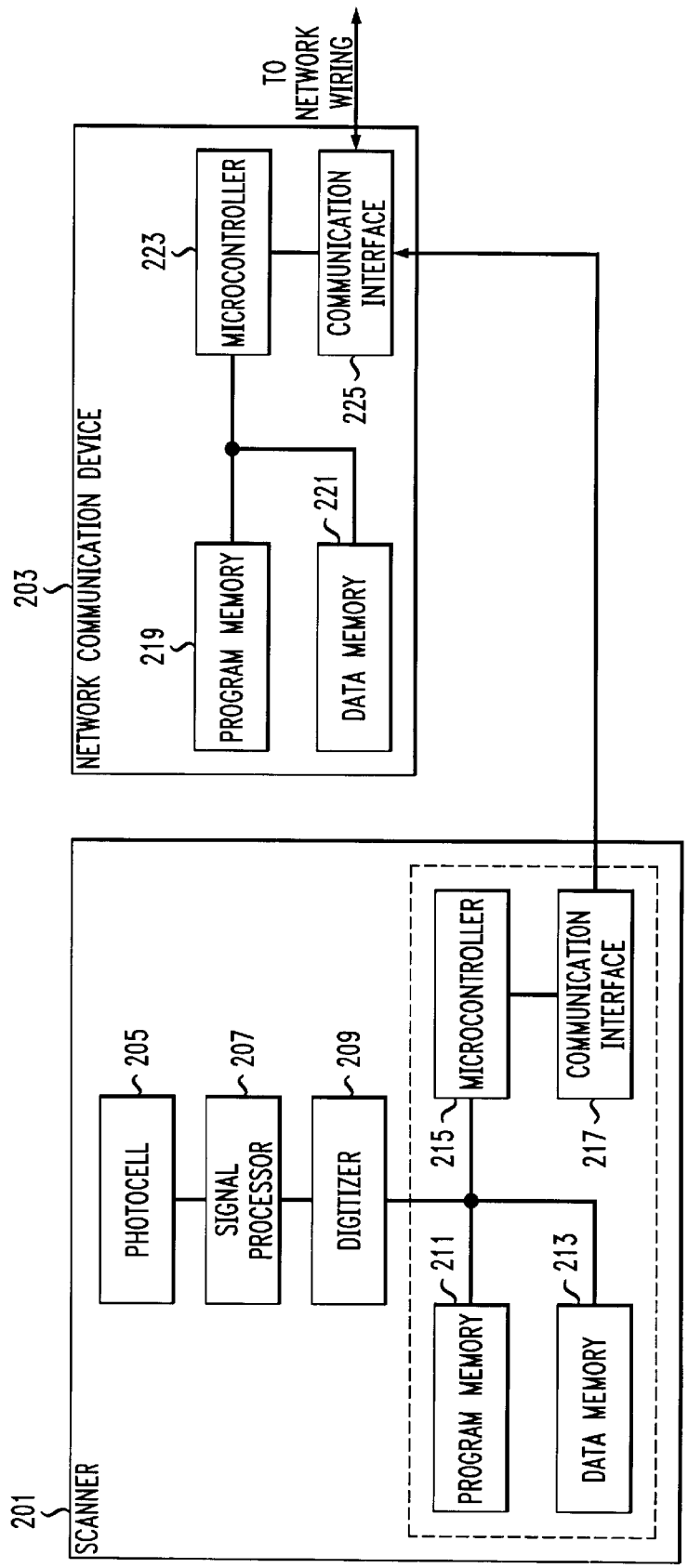
FIG. 2A is a hardware block diagram showing an illustrative prior art network interface device for interfacing a scanner with a communications network.
Figure 2B:
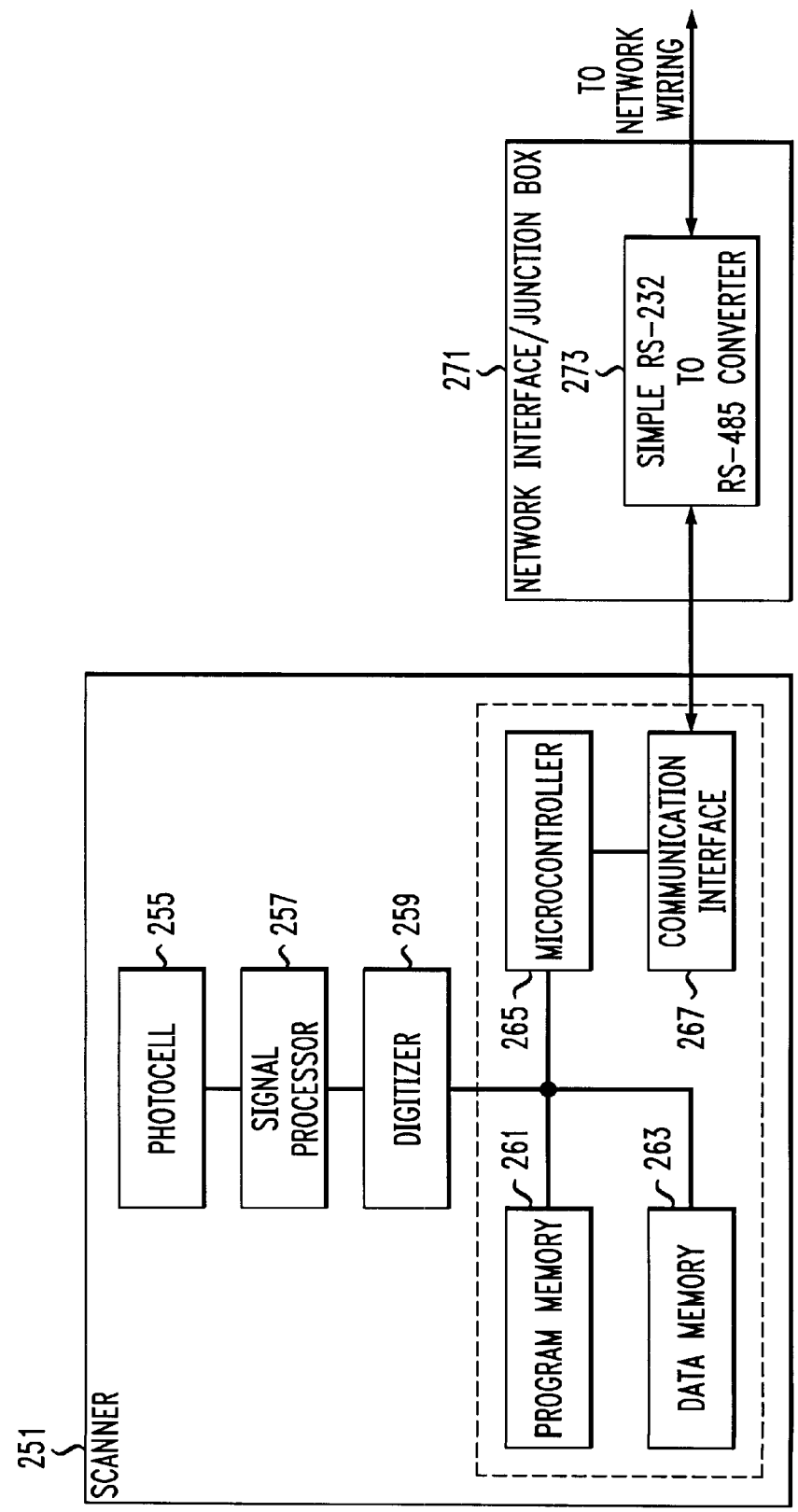
FIG. 2B is a hardware block diagram showing a direct interface between a scanner and a communications network according to a preferred embodiment of the invention.

FIG. 2B is a hardware block diagram showing a direct interface between a scanner 251 and a communications network according to a preferred embodiment of the invention. Scanner 251 includes a photocell 255 coupled to a signal processor 257. Signal processor 257 amplifies, filters, and processes the output of the photocell 205 so that the processed signal is in a form suitable for digitization by digitizer 259. The digitized signals are sent to a scanner processing mechanism consisting of a microcontroller 265, program memory 261, data memory 263, and a communications interface 267.

The communications interface 267 of scanner 251 is connected to a network interface/junction box 271. Junction box 271 need not be equipped with any processing mechanism, and could be implemented using only electrically passive components. However, for certain system applications, it may be desirable to equip the junction box 271 with data buffering circuitry and/or data drivers. These buffers and/or drivers could be used, for example, to convert standard RS-232 data signals into standard RS-485 data signals, as is shown in the example of FIG. 2B. This conversion is accomplished with simple RS-232 to RS-485 converter 273, which may be constructed using any of a number of integrated circuits available from vendors such as Newark Electronics of Chicago, Ill., Mouser Electronics of Randolph, N.J. and IEI Electronics, of Hazlet, N.J. Unlike the network communication device 203 of FIG. 2A, the junction box 271 of FIG. 2B does not includes any microcontroller, program memory, or data memory. Only the scanner 251 contains "intelligence" in the sense that it contains a processing mechanism—microcontroller 265. Such a hardware configuration is quite efficient, because it requires the use of only one microcontroller 265, one program memory 261, and one data memory 263 for each scanner 251—junction box 271 pair. Moreover, the use of one processing mechanism per scanner greatly simplifies the overall system, making the system much easier to set up and troubleshoot.

Figure 3:
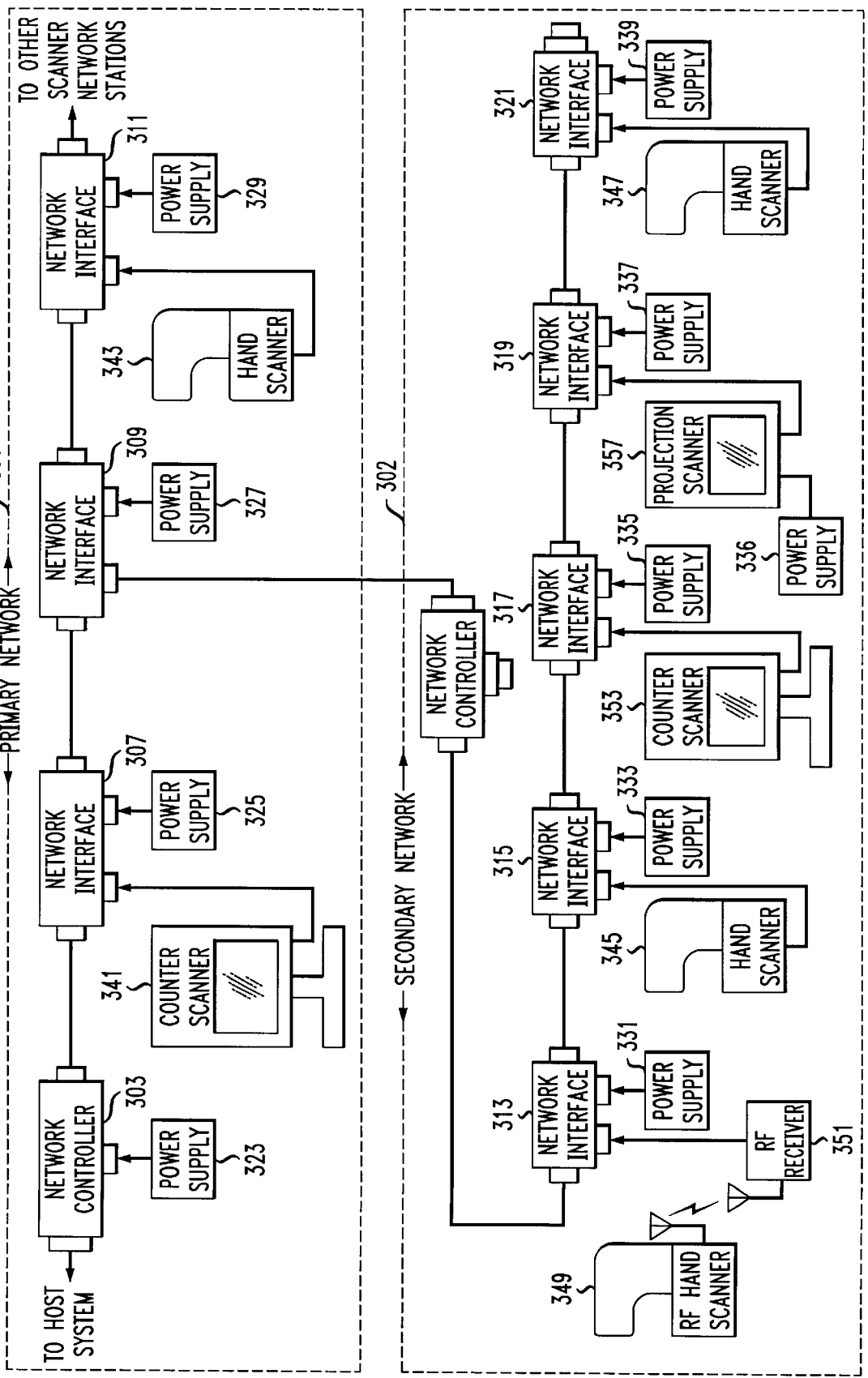
FIG. 3 is a hardware block diagram showing a communications network equipped to collect data from a plurality of scanners pursuant to a preferred embodiment of the invention.

Refer now to FIG. 3, which is a hardware block diagram showing a communications network equipped to collect data from a plurality of scanners pursuant to a preferred embodiment of the invention. This communications network includes a primary network 301 and a secondary network 302. Each of these networks utilizes a corresponding network controller 303, 305, respectively, which manages network data flow. Although the configuration of FIG. 3 shows the use of discrete network controllers 303, 305, this is for purposes of illustration, as such network controllers could be combined into a single controller, and/or implemented by one or more host devices coupled to the communications network. A host device could be used as a network controller so long as the host device could be configured to communicate in a form and format compatible with the communications network.

In the example of FIG. 3, network controllers 303 and 305 are configured in a manner such that secondary network 302 will download data collected by its scanners to primary network 301. Network controller 303 of primary network 301 then downloads scanner data acquired from both the primary network 301 and the secondary network 302 to a host device which may, but need not, be implemented using a computer server. Network controller 303 can upload data to a host system, even if the data originated from two separate networks (primary network 301 and secondary network 302), by using a single communications port connected to the host device.

The network controller 303 of primary network 301 is coupled to network interface 307 which, in turn, is coupled to network interface 309. Network interface 309 is, in turn, coupled to network controller 305 of secondary network 302, as well as to network interface 311. Network interface 311 may be coupled to optional additional scanning devices. These network interfaces 307, 309, 311 may be constructed in accordance with network interface/junction box 271 shown in FIG. 2B.

Network interface 307 is equipped to upload data from counter scanner 341. Power supply 325 provides power to counter scanner 341 through the network interface 307. Network interface 307 is also equipped to download this scanner data to network controller 303, and to download scanner data received from other network interfaces 309, 311. Network interface 309 is equipped to upload data from network interface 311, to download data to network interface 307, and to upload data from network controller 305 to network interface 307 and network controller 303 upon receiving instructions from network controller 303. Network interface 311 is equipped to upload data from hand scanner 343. Power supply 327 provides power to hand scanner 343 through network interface 311.

Data flow on secondary network 302 is controlled by network controller 305. Network controller 305 is coupled to network interface 313 which, in turn, is coupled to network interface 315 which, in turn, is coupled to network interface 317, which is coupled to network interface 319, and then to network interface 321. Network interface 321 may be coupled to optional additional scanning devices and/or network interfaces. These network interfaces 313, 315, 317, 319, and 321 may be constructed in accordance with network interface/junction box 271 shown in FIG. 2B.

Network interface 313 is equipped to upload data from an RF hand scanner 349 through an RF receiver 351. Power supply 331 provides power to RF hand scanner 349 through the network interface 313. Network interface 313 is also equipped to download this scanner data to network controller 305, and to download scanner data received from other network interfaces 315, 317, 319, 321 to network controller 305.

Network interface 315 is equipped to upload data from a hand scanner 345 to network controller 305 through network interface 313. A power supply 333 powers the network interface 313 as well as the hand scanner 345. Network interface 315 is also equipped to download data received from network interface 317 to network interface 313. Network interface 317 is equipped to upload data from a counter scanner 353 to network controller 305 through network interfaces 315 and 313. A power supply 335 powers the network interface 317 as well as the counter scanner 353. Network interface 317 is also equipped to download data received from network interface 319 to network interface 315.

Network interface 319 is equipped to upload data from a projection scanner 357 to network controller 305 through network interfaces 317, 315 and 313. A power supply 337 powers the network interface 319 as well as the projection scanner 357. Network interface 319 is also equipped to download data received from network interface 321 to network interface 317. Network interface 321 is equipped to upload data from a hand scanner 347 to network controller 305 through network interfaces 319, 317, 315 and 313. A power supply 337 powers the network interface 321 as well as the hand scanner 347. Network interface 321 is also equipped to download data received from optional additional network interface(s) to network interface 319.

Although the arrangement of FIG. 3 shows network interfaces in a daisy-chain architectural arrangement, this is only for purposes of illustration. The network interfaces could be arranged, for example, into a star architecture, a hub-and-spokes architecture, or any combination of architectures to suit the needs of specific system applications. Moreover, the use of separate power supplies is also illustrative, as a single power supply could be used to supply power to the entire network of FIG. 3, or, alternatively, a first power supply could supply power to the primary network 301, whereas a second power supply could supply power to the secondary network 302. In these alternative power supply arrangements, the corresponding network interfaces may include conductive paths for carrying AC and/or DC power to other network components.

All of the scanning devices shown in FIG. 3, such as counter scanner 341, hand scanner 343, hand scanner 345, counter scanner 353, projection scanner 357, hand scanner 347, and the combination of RF hand scanner 349 and RF receiver 351, include intelligence in the form of one or more processing mechanisms. These scanning devices may also be equipped with general-purpose communications hardware (such as a standard RS-232 interface) which is capable of transmitting and receiving information. In prior art systems, this communications hardware would be directly connected to a host system. By contrast, in the example of FIG. 3, this hardware is employed to communicate decoded symbol data through the primary network 301 and/or the secondary network 302 using one or more network interfaces 303, 307, 309, 311, 313, 315, 317, 319, 321.

The processing mechanism in each scanner is programmed to implement one or more communication protocols. The network interface to which the scanner is connected contains "unintelligent" hardware, such as buffers and data drivers, which utilize the electrical data signal generated by the scanner to provide an output signal in an electronic format suitable for transmission throughout primary network 301 and secondary network 302. For example, bar code scanners may be equipped to generate an RS-232 compatible signal in response to the scanning of one or more bar code symbols. The network interface would use transistor buffers and driver circuits to translate these RS-232 signals into RS-422 signals, RS-485 signals, tri-state signals, or any other type of electronic format to be used by the communications network including primary network 301 and secondary network 302. However, the network interface need not include any data translation mechanism. For example, if the scanners are equipped to output RS-232 data, and the communications network is also designed to handle RS-232 data, then the network interface could merely amplify or buffer the signals to overcome any losses or noise, or the interface could, even more simply, merely provide conductive pathways over which the RS-232 data may be conveyed. Alternatively, the scanners may be equipped to output data in RS-485 format, in which case, the interface could include electrically passive components such as connectors and conductive pathways, plus optional buffer amplifier stages.

Figure 4:
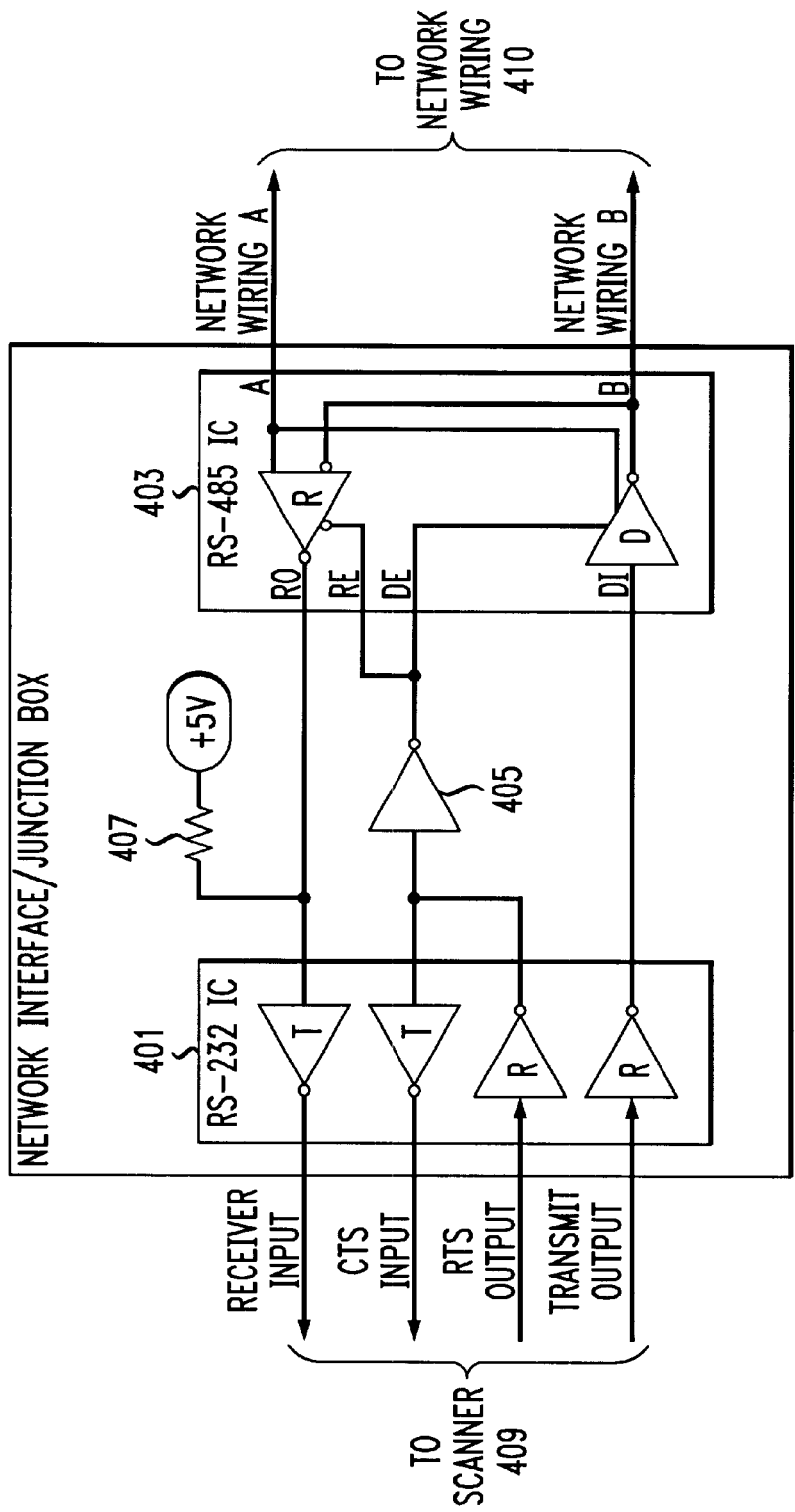
FIG. 4 is a schematic diagram showing illustrative electronic components which may be used to construct the network interface devices of FIG. 3.

FIG. 4 is a schematic diagram showing illustrative electronic components which may be used to construct any of the network interfaces 307, 309, 311, 313, 315, 317, 319, 321 of FIG. 3. A data input port 409 is adapted for coupling to a bar code scanner, and a data output port 410 is adapted for coupling to a communications network. A standard RS-232 driver/receiver 401 integrated circuit is connected to input port 409. In its standard configuration, this integrated circuit uses a pull-up resistor 407 connected to a +5-Volt DC supply. The data output port 410 is connected to the "A" and "B" terminals of a standard RS-485 driver/receiver 403 integrated circuit. The "RO" output of driver/receiver 403 is connected to the input of a first inverting driver amplifier within the driver/receiver 401 integrated circuit. The output of a first inverting receive buffer within the RS-232 driver/receiver 401, as well as the input of a second inverting driver amplifier within the driver/receiver 401, are both connected to an inverter 405, which, in turn, drives the "NOT-RE" and "DE" inputs of the RS-485 driver/receiver 403. Finally, the output of a second inverting receive buffer in the RS-232 driver/receiver 401 is connected to the "DI" input of the RS-485 driver/receiver 403. These interconnections between driver/receiver 401 and driver/receiver 403 perform the function of converting RS-232 data at data input port 409 into RS-485 data at output port 410. As will be appreciated by those skilled in the art, the electronic components necessary to construct the junction box are readily available from any of a variety of dealers and/or suppliers, including the aforementioned supply firms of Newark Electronics, Mouser Electronics, and IEI Electronics. The driver/receiver 401, 403 integrated circuits are manufactured by a number of companies including National Semiconductor, Texas Instruments, Linear Technology, and Maxim.

Pursuant to an illustrative embodiment of the invention, the configuration of FIG. 4 is used in conjunction with RS-232 communication hardware in a scanning device to drive and control RS-485 hardware in the network interface/junction box. The RS-485 hardware in the junction box in turn is connected to the network wiring and drives it. Considering data signal flow in the configuration of FIG. 4, it is fairly obvious that the data content of any transmitted or received signal (data, baud rate, parity, etc.) is not changed by the junction box hardware. Note, for example, that the RS-232 driver/receiver 401 is directly linked to the RS-485 driver/receiver 403 without any microprocessor performing data processing.

The example of FIG. 4 converts signals from RS-232 format to RS-485 format to achieve the objectives of many real-world system applications, but, at the same time, it must be clearly understood that the invention does not require such conversion to take place. To understand the reason why one might wish to convert an RS-232 signal into another type of signal, one must first understand the characteristics of RS-232 signals. Standard RS-232 communication has limited range, which is actually specified in the RS-232 standard as 50 feet of wiring. The intention of the RS-232 standard is to provide for the connection of a single electronic device to another electronic device. Although most existing scanning devices contain an RS-232 interface, it is wholly unsuited for providing communications over a practical data network that is used to link bar code scanners to a host device.

By contrast, the RS-485 standard provides for the transmission of data over much longer distances, up to 4000 feet of wiring. The RS-485 standard also contemplates the connection of a multiplicity of electronic devices to a single communication line. Accordingly, the RS-485 standard is well-adapted for use in the operational environment of a bar code scanner data communications network. Nevertheless, in order to work properly, the RS-485 communication hardware must be located as close to the network wiring as is practicable. In some cases, this may be incompatible with the location of the scanning equipment.

The network interface/junction box of FIG. 4 solves both the signal conversion and location problems. This box allows the scanner to be remotely located from the network wiring, thereby providing a simple system installation. Additionally, the network interface/junction box transforms a bar code scanner's limited-range, RS-232 signal into an equivalent RS-485 signal suitable for transmission over the communications network and also transforms RS-485 signals on the network into an RS-232 format suitable for receipt by the bar code scanner. In this manner, the network interface/junction box permits the bar code scanner to be used in a network configuration, and provides for bidirectional data flow.

Since RS-485 provides only for simplex data communications, it allows only one device, i.e., a bar code scanner or a network controller, to transmit data at any particular time. Thus, the RS-485 transmitter in the junction box must be controlled by the scanner so that it can be enabled only when the scanner is required to transmit data. Returning to FIG. 4, this is accomplished by utilizing the scanner's RS-232 Request To Send (RTS) hardware "handshake" signal. When the scanner activates this signal, it also activates the RS-485 transmitter in the network interface/junction box by supplying the "DE" Driver Enable) terminal of the RS-485 IC with an active "high" level enabling signal. The RTS signal is also passed through the interface hardware and is returned to the scanner as a Clear to Send (CTS) signal. The CTS signal is interpreted by the scanner as confirmation that the transmitter is active and ready to transmit data.

Illustratively, the RTS signal from the scanner can be employed to disable the output of the receiver in the RS-485 driver/receiver 403 contained in the network interface/junction box when transmission is in progress. This prevents feedback of the transmitted signal to the scanning device. This configuration can be modified, however, by disconnecting the RE (Receiver Enable) terminal of the RS-485 IC and connecting this terminal directly to ground. This allows the RS-485 receiver to remain continuously active and allows the scanner to monitor its own transmission on the network.

In the prior art, a microprocessor-equipped scanning device would have used its microprocessor only to decode bar symbol data and to transmit that data, using RS-232 communication signals, to a single host device. However, the configuration of FIG. 4 enables this scanning device microprocessor to be used for additional tasks beyond merely decoding bar code symbols and then communicating RS-232 data. The microprocessor of the scanning device can now be used to communicate data over an entire communications network which may include a plurality of host devices. However, the software that is loaded into existing bar code scanner microprocessors is not sufficient to enable communications over an entire communications network.

I have developed an appropriate software program, executable by the scanner microprocessor, to implement network communications. In this manner, the scanner can communicate with any of a plurality of host devices. This software will be described hereinafter with reference to FIGS. 8–13. However, it is first considered noteworthy to mention one or two advantageous characteristics of a scanner that is equipped for direct communications over a network. Direct communications refers to the fact that the scanner processing mechanism communicates directly with a network-controlling processor, without the need for an intermediate processing mechanism between the scanner processing mechanism and the network-controlling processor. These advantages allow a manufacturer of bar code scanners to incorporate networking capabilities into the product line without having to change the actual hardware configuration of the scanner. It also permits the manufacturer to offer this value added feature at a minimum cost to customers (the cost of a FIG. 4-style hardware box, plus the cost of a reprogrammed scanner), which allows these customers to utilize a scanning system network in real-world applications that were previously precluded because of the high cost of the required network hardware. The networking features described herein can also be applied to miniature scanning devices presently under development. This allows a customer to group a number of these small scanning devices together in a single enclosure for the purpose of providing multiple scan patterns while still providing a single composite data output signal from all the scanners to a host device via the network and its controller.

Figure 5:
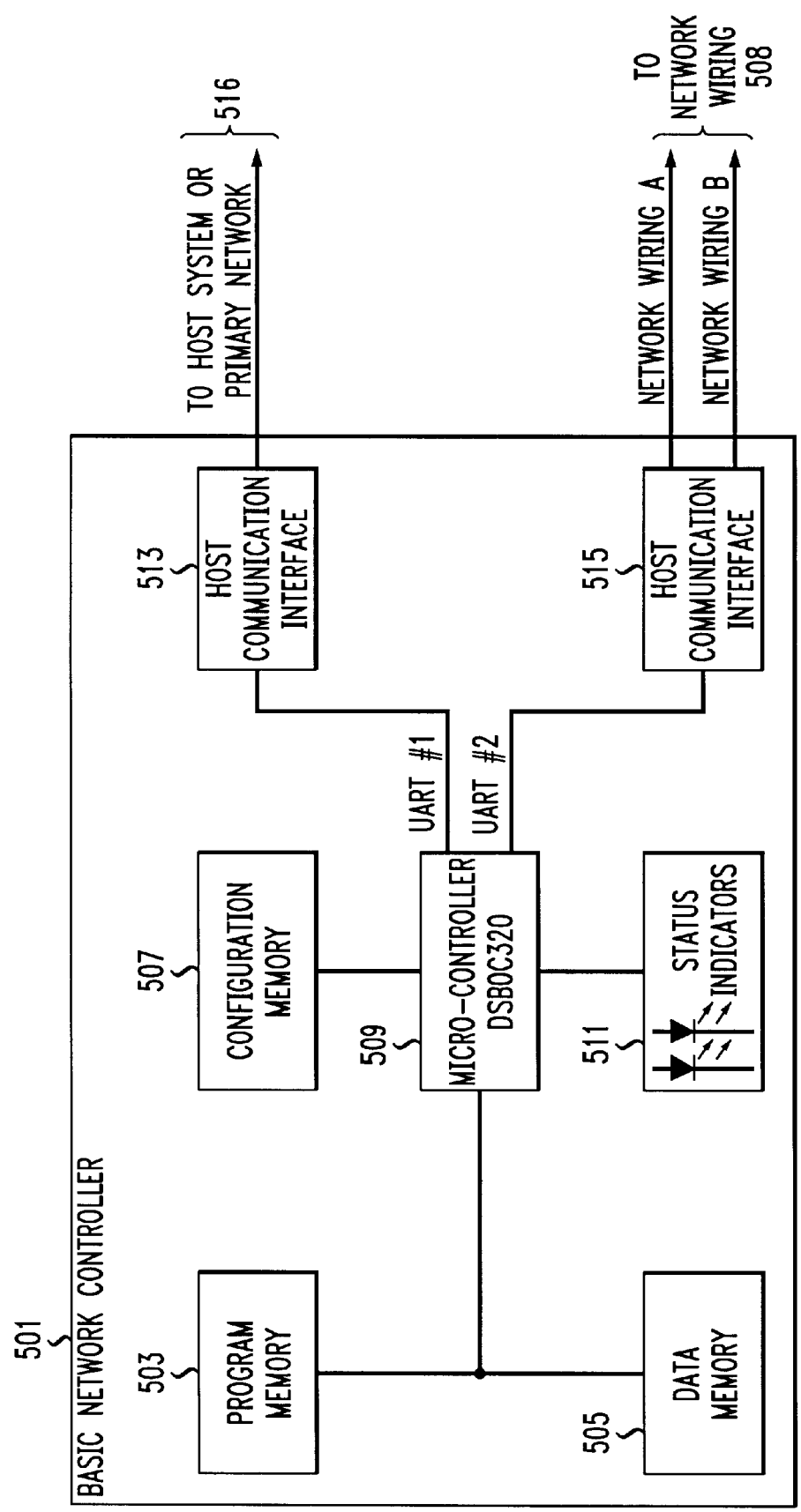
FIG. 5 is a hardware block diagram setting forth various functional components of the network controller of FIG. 3.

Refer now to FIG. 5, which sets forth an illustrative hardware configuration for the network controllers 303, 305 shown in FIG. 3. Basically, network controlling devices should contain the intelligent systems necessary to: (a) gather and store network-generated data, and (b) to control signal transfers on the network itself. As applied to networks that include bar code scanners, the controller should be equipped to accesses every scanning device connected to the network. This function may be accomplished by first addressing each scanner that is uniquely identified to the network (i.e., by a network address assignment or allocation), and then requesting that scanner to report any data it might contain. The method and means used to communicate this accumulated data to a host device is, of course, dependent upon the specific requirements of the host device(s) coupled to the network.

The illustrative network controller of FIG. 5 utilizes a micro-controller 509, which may be implemented, for example, with a DS80C320 integrated circuit produced by Dallas Semiconductor. Micro-controller 509 is coupled to configuration memory 507, status indicators 511, program memory 503, and data memory 505. The micro-controller 509 provides a first UART which is coupled to host communication interface 513, and a second UART which is coupled to a network communication interface 515. The host communication interface 513 provides a first port 516 adapted for connection to a host system or a primary network. The network communication interface 515 provides a second port 508 which is adapted for coupling to network wiring. It is to be understood that devices other than those shown in FIG. 5 could be used to accomplish the same function, and FIG. 5 is merely intended to be an illustrative example of a workable hardware configuration. It should be parenthetically noted that the DS80C320 micro-controller is well-suited for the present application since it contains two fully independent, full duplex, Universal Asynchronous Receiver Transmitter circuits (UART's), described above as first and second UARTs. This makes it possible to communicate with both the network and the host system independently while, at the same time, using a minimum amount of hardware.

The network controller of FIG. 5 may advantageously be constructed and programmed so as to allow it to be accessed as if it were a single scanning device connected to the primary network. This allows the user to start a secondary scanning network at any point in the primary network's structure without requiring extensive changes to the primary network's wiring. The use of such primary and secondary networks was previously illustrated in FIG. 3. This provides for relatively quick and simple changes to the network. By way of example, in a typical hardware implementation, the only other hardware required to provide a secondary network is a simple adapter cable which connects the secondary controller's "host" data output connector FIG. 5, first port 516) to a scanner input connector on one of the primary network's interface/junction boxes FIG. 3, network interfaces 309 and 313).

Next, the basic network communication protocol will be described with reference to FIGS. 6 and 7. After these protocols are fully described, the actual steps that are performed during network communications will be set forth in a series of flowcharts. A first group of flowcharts, FIGS. 8 through 11, detail the manner in which the controller provides integration of a plurality of scanners into a communications network. A second group of flowcharts, presented as FIGS. 12 and 13, detail the scanner's response to the controller's provision of integration. In order to fully understand these flow charts, however, it is first necessary to understand the basic communication protocol of the network.

Figure 7A:
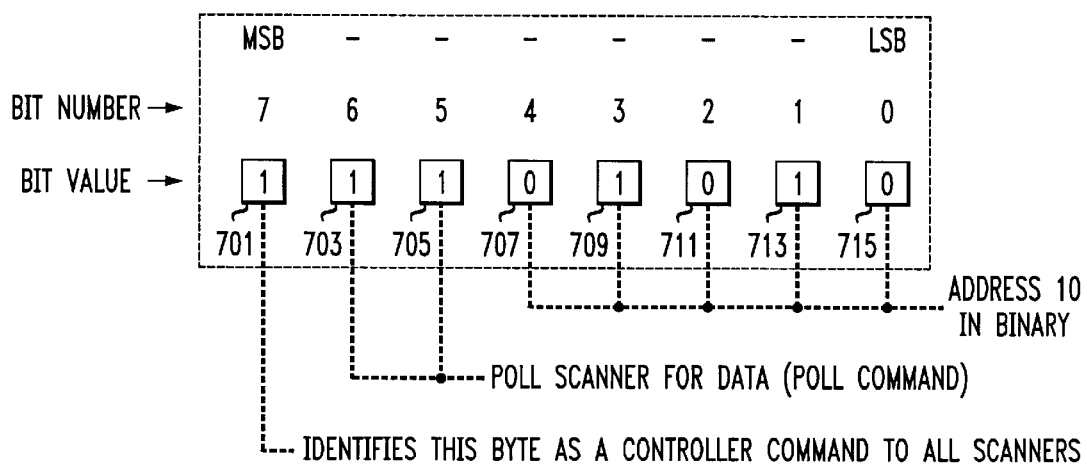
FIG. 7A is a data structure diagram representing a poll command sent from the communications network to the scanner.
Figure 7B:
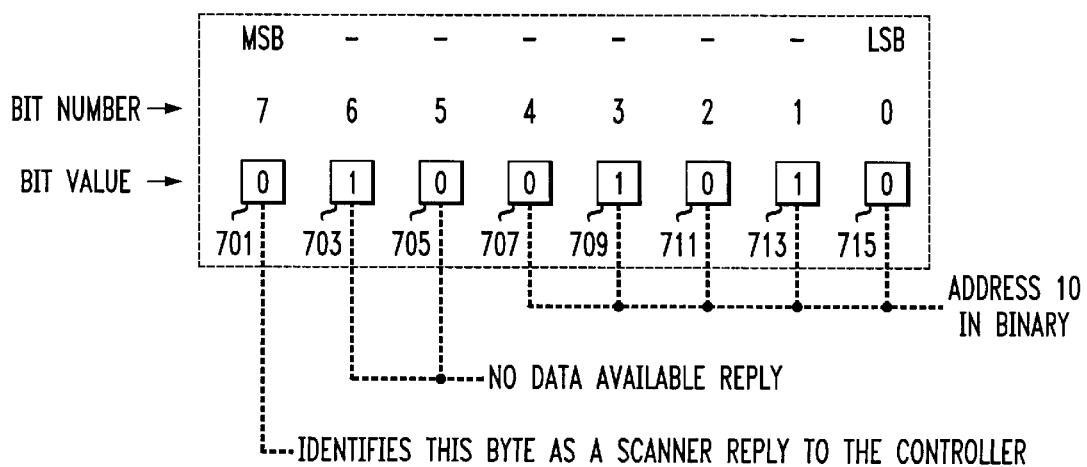
FIG. 7B is a data structure diagram representing a no-data-available reply received from the scanner over the communications network.

FIGS. 6, 7A, and 7B set forth data structure diagrams for an illustrative basic communications protocol that allows the network controller to use a single address/command byte of 8 bits to send 4 different commands to a maximum of 31 individually addressed scanners. The same data structure also allows each scanner to identify itself when it replies and to reply with 4 different responses to these commands. Refer now to FIG. 6, which is a data structure diagram representing a command sent to, or a reply received from, a scanner. The format of such a command or reply is an address/command/reply byte. The byte carries 3 pieces of information.

The "C" bit (the most significant bit, bit 7, reference numeral 601) identifies the source of the transmission. When the controller transmits a command byte to a scanner, it sends this bit as a 1. When a scanner transmits a reply byte or data to the controller it sends this bit as a 0. The "F" bits (its 6 and 5, reference numerals 603 and 605) identifies the function of the byte. This function is also dependent upon the source of the transmission. When a network controller makes the transmission, the function is defined as a command. When the scanner makes the transmission, the function is defined as a reply. The four commands and four replies are summarized by a table in FIG. 6, and their functions are as follows. The controller RESET command (bit 6=0 and bit 5=0) forces a scanner to re-initialize itself and to discard any scanned bar code label data it has stored. The controller ACK (acknowledgment) command (bit 6=0 and bit 5=1) tells the scanner that the controller has successfully received the data that the scanner had previously sent it. The controller NAK (non-acknowledgment) command (bit 6=1 and bit 5=0) tells the scanner that the controller failed to receive the scanner's previous data transmission correctly and that the controller requests a retransmission of that data. The controller POLL command (bit 6=1 and bit 5=1) tells the scanner that the controller is making a new request for a data transmission from the scanner. A scanner reply with "F" bits 6 and 5 both equal to zero is not used in this basic protocol but is reserved for future use. The scanner DATA AVAILABLE reply (bit 6=0 and bit 5=1) informs the controller that the scanner has scanned label data available for transmission. The scanner would then transmit that data following this reply. The scanner NO DATA AVAILABLE reply (bit 6=1 and bit 5=0) informs the controller that the scanner has nothing available to transmit. The scanner RESET ACK reply (bit 6=1 and bit 5=1) informs the controller that the scanner is acknowledging the successful reception of the controller's previously sent reset command and that it has re-initialized itself.

The "A" bits (bits 4 through 0 in the address/command/reply byte, reference numerals 607, 609, 611, 613, 615) identify the address of the scanner to which a command is directed and from which a reply comes. The address is in binary format with its most significant bit (MSB) being bit 4 of the byte and its least significant bit (LSB) being bit 0.

Refer now to FIG. 7A, which is a data structure diagram representing a poll command sent from the communications network to the scanner, and also to FIG. 7B, which is a data structure diagram representing a nodata-available reply received from the scanner over the communications network. As an example of the protocol described in FIG. 6, if the controller wishes to poll scanner #10 for data, it would send a command to the network as shown in FIG. 7A. All scanners on the network would recognize this transmission as a controller command byte since the MSB of the transmission, reference numeral 701, (FIG. 7A) is a 1; however, all but scanner #10 would ignore it since only scanner #10's address matches the transmitted address. That scanner would then recognize that the controller was making a poll request since bits 6 and 5, reference numerals 703 and 705 (FIG. 7A) were both 1. Note that reference numerals 701, 703, 705, 707, 709, 711, 713, and 715 of FIGS. 7A and 7B correspond directly to reference numerals 601, 603, 605, 607, 609, 611, 613, and 615 of FIG. 6.

If scanner #10 had no bar code label data available, it would then transmit a "No Data Available" reply as shown in FIG. 7B. The controller recognizes this transmission as a scanner reply byte since the MSB of the transmission, reference numeral 701 (FIG. 7B) is a 0. It would then recognize that the reply came from scanner #10 since the binary address bit pattern of the transmission equals 10. The controller would also recognize that the scanner was making a no data available reply since bit 6 of the transmission is a 1 and bit 5 is a 0. (All other scanners on the network would recognize the transmission as a scanner reply because the MSB of the transmission is a 0, and would ignore the remainder of the transmission.) If scanner #10 had bar code label data available, it would transmit a "Data Available" reply to the controller in place of the reply shown in FIG. 7B. This "Data Available" reply would be provided by transmitting bit 6 as a 0 and bit 5 as a 1. It would then follow that reply, after a short delay, with the actual code label data in, for example, ASCII format. The scanner data transmission would then be terminated with the ASCII control characters of CR (Carriage Return) and LF (Line Feed) in this embodiment.

Figure 8:
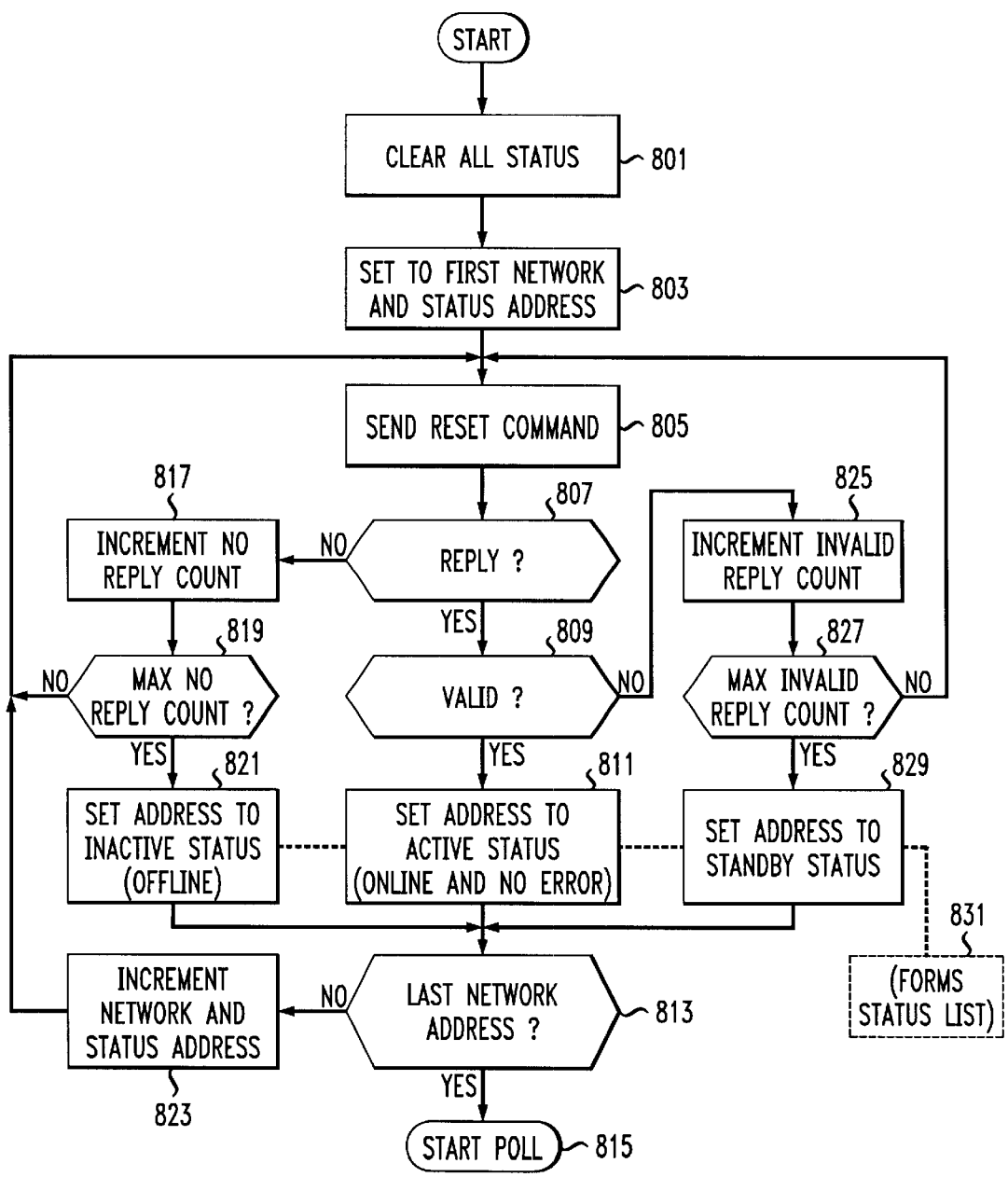
FIG. 8 is a flowchart setting forth an operational sequence executed by the network controller of FIG. 3

FIGS. 8, 9, 10, and 11 are flowcharts setting forth operational sequences executed by the network controllers (FIG. 3, 303, 305) to implement the network communications protocol discussed above in connection with FIGS. 6 and 7. FIG. 8 sets forth a program routine that the controller executes when it is trying to determine which network addresses are actually, in fact, "active". Inactive network addresses may correspond to bar code scanners that are not in use, and/or to ports that are not connected to any other hardware components. The network controller uses this routine to form a "status list" of addresses for later use in polling the network so that no time is wasted in polling inactive addresses. This status list consists of a single byte of controller memory for each network address. The byte stores the status of the address.

There are 4 status conditions possible for each address. The first is on line and active with no communication errors. The second is on line but experiencing communication problems. The third is temporarily off-line because of communication problems. The forth is off-line and inactive. In addition, the byte also stores "No Reply" and "Communication Error" counts which determine the status of the address. If the total byte is reset (all zero's) the status of the address is considered to be on line and active (#1 above).

The routine of FIG. 8 commences at block 801 where the first operation the controller performs is to reset or clear the status bytes of all the network addresses. This operation prepares the network for a new status polling operation and the formation of a new status list. The next operation, block 803, is to set up the controller to integrate the first network address (#1) and to store the results of that integration in the status byte assigned to that address (#1). The integration takes the form of sending a reset command to the first network address (block 805) and then looking for a reset acknowledgement from that address (block 807). If there is no reply to the reset command after an appropriate amount of time, (the negative path to block 817), the controller will increment the no reply count for that address (lock 817) and then check to ascertain whether or not the count has reached its maximum value (block 819)(in this embodiment, the maximum value is 15). If it has not, the controller will loop back to block 805, giving the address another chance to reply, until eventually the maximum no reply count is reached. Once this occurs, (affirmative Y path to block 821), the controller assumes that there is nothing connected to the network that has been programmed to respond to that address and will assign this address an Inactive/Off line status which prevents it from being polled in the future. The routine then advances to block 813, to be described later.

If the address does respond to the reset command at block 807, the controller then checks to see that the response is a valid reset acknowledgment reply (block 809). If the reply is not valid, (N path), the controller advances to block 825 and increments the invalid reply count for that address and then checks to ascertain whether or not the count has reached its maximum value (block 827) (in this embodiment, the maximum value is 3). If the count has not reached the maximum value, the controller will repeat this routine giving the address another chance to reply correctly until the maximum invalid reply count is reached by looping back to block 805. Once the maximum invalid reply count is reached (Y path from block 827 to block 829), the controller assigns that address a "standby" status which places it temporarily off line. This prevents the polling of that address when the network is busy. The controller may maintain an optional address standby status list at block 831.

If the address responds correctly to the reset command at block 809 with a reset acknowledgment, the routine advances along the Y path to block 811 where the controller assigns an "active/on line" status to that address. The controller will poll that address for data in the future.

The above routine is repeated for each network address (blocks 813 and 823, and loop back to block 805) until the last address (#31) has been processed. At this time, the status of all network addresses has been determined and the controller is ready to begin polling.

Figure 9:
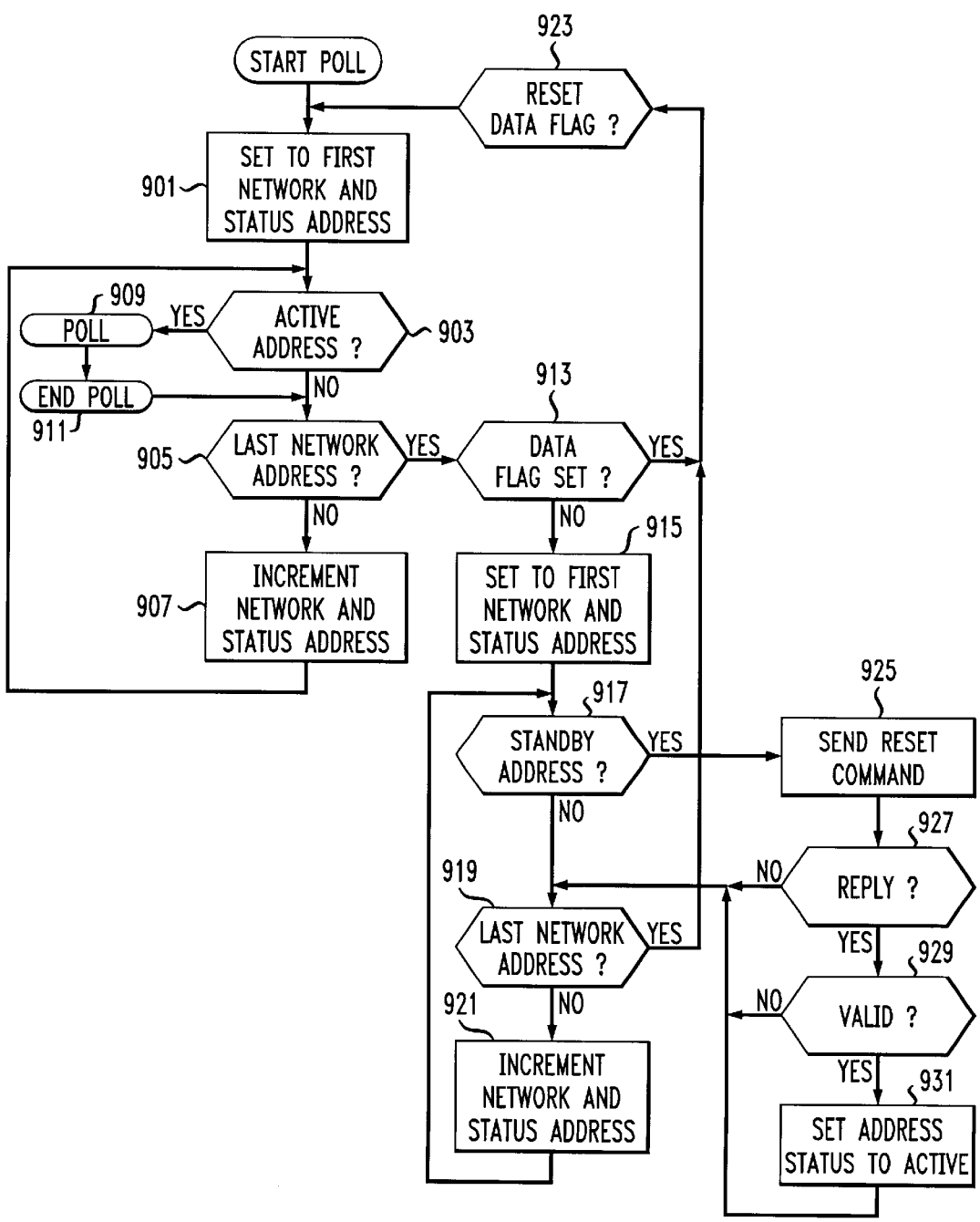
FIG. 9 is a flowchart setting forth an operational sequence by which the network controller polls each of a plurality of scanners.

FIG. 9 is a flowchart setting forth the manner in which the network controller polls each of a plurality of scanners. The controller uses the routine of FIG. 9 to determine which address it will poll next. Address selection begins at block 901 with the first network address (#1). The status of this address is checked at block 903 to determine if it is active (on line), for example, by using the optional status list data generated in FIG. 8 (block 831). If it is active, (Y path to block 909), the controller will then poll this address (block 909). This process of polling will be described later in conjunction with FIG. 10. If the status is not active, the N path from block 903 is followed to block 905. This path, block 903 to block 905, is indicative of standby or inactive/off line status. The controller will skip this address and, at block 905, will check to see if it has processed the last network address (#31). If the controller has not processed this address, it will increment the address number to be processed at block 907, and will then loop back to block 903 to repeat the above-mentioned steps of the routine until the maximum network address has been processed, whereupon the controller advances to block 913. Thus, at first, the controller is called upon to only poll active addresses.

After the last network address has been processed, (Y path to block 913), the controller then checks to see if it has been busy receiving data from any scanner by checking to see if the data flag is set. If it is set, (Y path to block 923), the controller resets this flag and then goes back to the routine (block 901) which causes the controller to poll only active addresses. If the flag is not set, (N path from block 913 to block 915), then the controller knows that it has polled all active addresses and has not received data from any of them. This means that it has not been very busy and has time to check the standby addresses (block 917) for proper response. As in the active address routine, each network address is again checked, but this time each address is checked for standby status. If the address checked does not have standby status, the routine advances along the N path from block 917 to block 919, indicating an active or inactive/off line status. The controller skips this address and checks the next address. If a standby address is found, (Y path from block 917 to block 925), the controller issues a reset command to that address and waits for a reply (block 927). If no reply is forthcoming, the N path from block 927 loops back to block 919. If a reply is forthcoming, the program advances to block 929, but if this reply is invalid, the program then loops back along the N path from block 929 to block 919. When the program loops back from either block 927 or block 929 to block 919, the controller skips this address and leaves the status of the address set to standby. If the controller gets a valid reply (reset acknowledgment) from the address (Y branch from block 929 to block 931), then the controller notes that the address is now active and on line and sets its status as such. The standby address routine is repeated (loop from block 931 to block 919) until all addresses have been checked. After this is accomplished, the controller returns to the active address routine detailed previously.

In summary, FIG. 9 sets forth an operational sequence wherein the network polls only active addresses on a regular basis and, at the same time, effectively ignores inactive, i.e., off-line, addresses. The operational sequence also provides for the integrating of standby addresses for reset command response polling as time permits. This process minimizes the time required to poll all active scanners connected to the network, and also allows scanners which have been experiencing communication problems, or scanners which have been temporarily disconnected from the network, to rejoin the network automatically.

Figure 10:
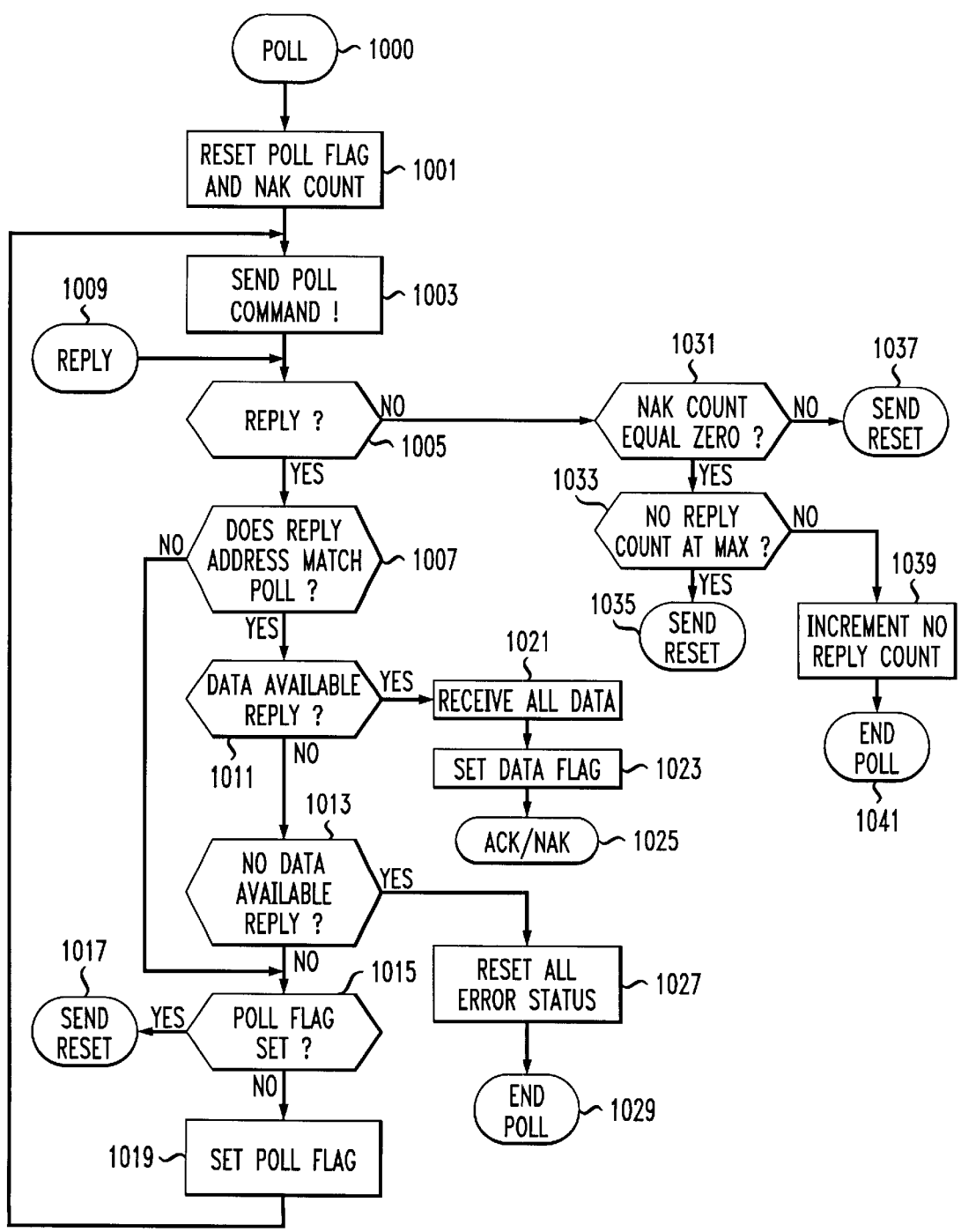
FIG. 10 is a flowchart setting forth an operational sequence by which the network controller receives a reply from a scanner.

FIG. 10 is a flowchart setting forth an operational sequence by which the communications network receives a reply from a scanner. FIG. 10 is related to FIG. 11, to be described in greater detail hereinafter, in that both FIGS. are flowcharts that illustrate the network communications protocol processes of polling and response. After the active address routine of FIG. 9 selects the address to be polled, the controller polls this address in accordance with the procedure set forth in FIG. 10. When a new poll is started (block 1000), the controller first resets its poll flag and NAK count (block 1001). The controller then sends a poll command to the selected active address (block 1003) and waits for a reply (block 1005). If no reply is forth coming, N path to block 1031), the controller then checks the current NAK (no acknowledgment) count for zero. Since this is the first time the address was polled, this count will be zero, (Y path from block 1031 to block 1033), so the controller will then check to see if the current no reply count for the address is at its maximum value (in this embodiment, the maximum value is 15). If the count is not at its maximum value, the N path from block 1033 to block 1039 is followed. The program increments the no reply count for the address (block 1039) and ends the poll (block 1041). After the poll is ended at block 1041, the program commences execution of the operational sequence of FIG. 9 by selecting the next active address to be polled.

If the test at block 1033 shows that the maximum no reply count has been reached, the Y path is followed to block 1035. When the Y path is followed, it means that this particular address has been polled for 15 times (the maximum value in the present embodiment) and, for each of these 15 times, has provided no response. The controller will then send a reset command to this address (block 1035). The process of sending a reset command is described more fully in the context of FIG. 11 (to be discussed later) to try to determine if this address is still active. The poll of this address will then end.

If, back at block 1005, a reply was obtained from the first poll attempt, the controller will then check to see if the address of the reply matches the address polled (block 1007). If they do not match, an error condition exists and the address will be re-polled once (as will be explained in greater detail below). Normally, it is expected the addresses will match, so, in most cases, the controller will advance to block 1011 to check the reply to see if data are available. If data are available, the Y path is followed to block 1021 where the controller begins receiving this data. After the data have been received, the controller sets a data flag which is used by the operational sequence of FIG. 9 at block 913. The controller then proceeds to execute the ACK/NAK (acknowledgment/no acknowledgment) routine shown in FIG. 11, to be discussed hereinafter.

If the first poll attempt reply (block 1011) is not a "data available" reply, the N path leads to block 1013, where the controller will then check to see if it is a "no data available" reply. If it is just such a reply, the Y path from block 1013 to block 1027 is followed. At block 1027, the controller considers this to be a valid poll response and, as a result, resets any accumulated error status (no reply and reset acknowledgment error counts), after which the controller then ends the poll of that address (block 1029). If the response is not a "no data available" reply, then the branch from block 1013 to block 1015 is followed, indicative of an error condition. At block 1015, the controller re-poll the current address once as detailed below. If either an address mismatch or reply error condition exists, the controller will then check its poll flag to see if it is set (also at block 1015). Again, since this is the first time this address was polled, the flag will not be set. The controller will follow the N branch to block 1019 to set the poll flag and then loop back to block 1003 to send another poll command If the response to the second poll is also in error (blocks 1003, 1005, 1007, 1011, 1013) the controller will again recheck its poll flag (block 1015) and this time will find it set, whereupon the Y path from block 1015 is followed to block 1017. The controller will then send a reset command (block 1017) to this address, as will be shown in FIG. 11. The poll of this address then ends.

Figure 11:
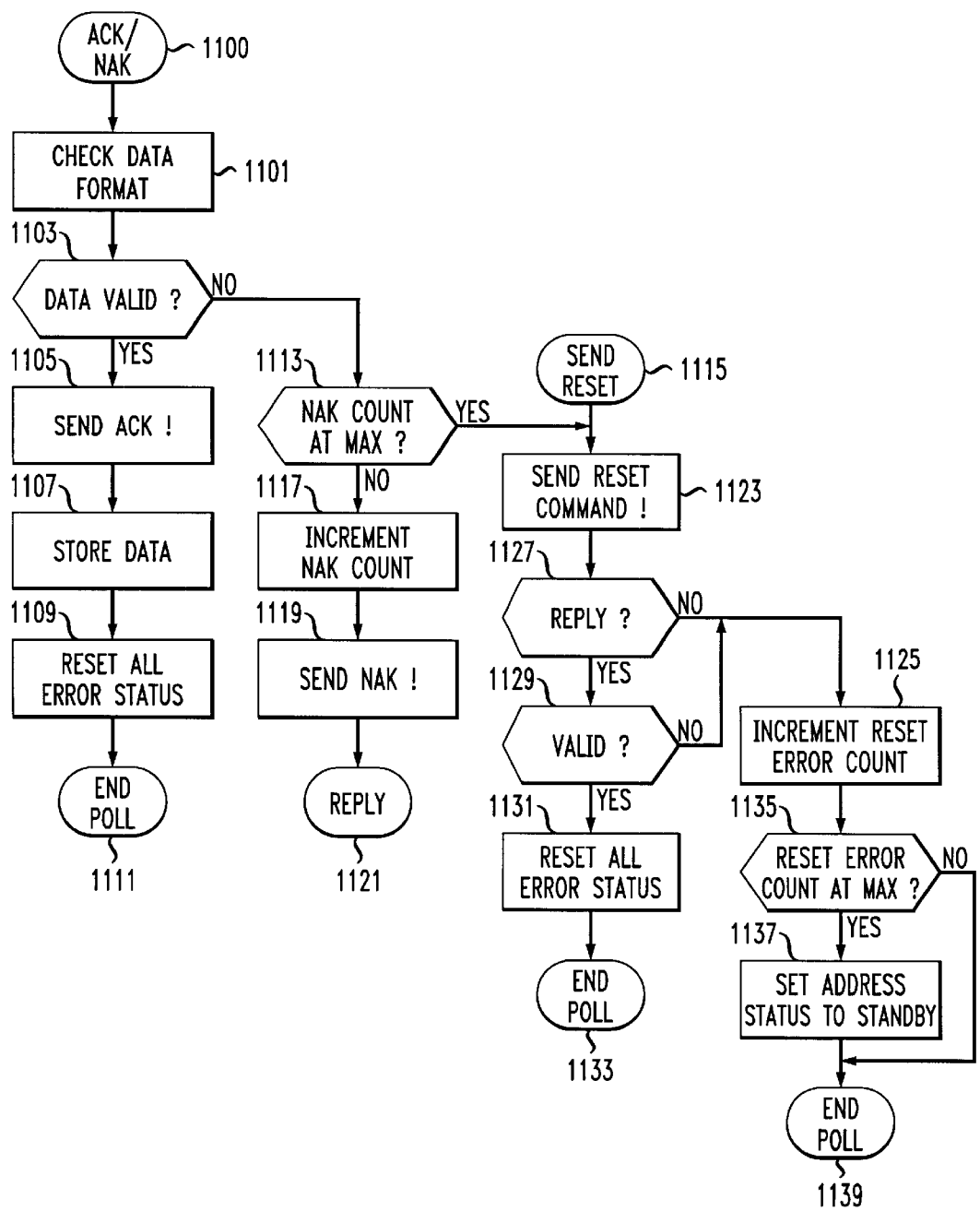
FIG. 11 is a flowchart illustrating the network communications protocol processes of polling and response.

FIG. 11 is a flowchart setting forth an acknowledgment/no acknowledgment (ACK/NAK) routine executed by the network controller. The ACK/NAK routine is started when the polling routine of FIG. 10 produces a "data available" response (blocks 1011, 1021, 1023, and 1025). Data will have been received and the data flag will be set when this routine is entered. Returning to FIG. 11, the controller commences performance of the ACK/NAK routine (block 1100) by checking the data for proper form and format to see if the data are valid (blocks 1101 and 1103). If the data are valid, the program progresses to block 1105 where the controller sends an ACK command, signifying a "Data Received OK Acknowledgment", to the polled address. The controller then stores the valid data (block 1107) and resets any accumulated error status (block 1109), by zeroing the no reply and reset acknowledgment error counts). The controller then ends the poll of that address (block 1111).

If, after checking the received data, the controller finds that it contains errors in form or format, the N path from block 1103 leads to block 1113 where the controller then checks to see if the current NAK count is at its maximum value (in this embodiment, the maximum value is 3). If this is the first poll attempt, the NAK count will be zero, (N path), so the controller will increment the NAK count (block 1117) and send a NAK command, signifying "Data Reception No Good", to the polled address (block 1119). This will force the polled address to retransmit its data again. After sending the NAK command, the controller will return to the "Reply" point (FIG. 11, block 1121) to wait for this retransmission.

Block 1121 of FIG. 11 leads to the "Reply" point shown in block 1009 of FIG. 10. If the NAK command produces no reply as determined at block 1005 of FIG. 10, the controller will then check to see if the NAK count is still zero (block 1031), but this count won't be zero, since the polled address has already been "NAK'd" once. In this case, the controller will then send a reset command to this address (block 1037), which leads to the "send reset" block 1115 of FIG. 11. The poll of this address will then end. If retransmission of the NAK'd data occurs, the controller will receive a "data available" reply FIG. 10, block 1011) and the data (block 1021). It will again set the data flag (block 1023) and re-enter the ACK/NAK routine (FIG. 10, block 1025, and FIG. 11, block 1100). Data are once again checked for validity (blocks 1101 and 1103) and if valid, the controller will follow the ACK routine set forth in blocks 1105, 1107, 1109, and 1111 as detailed previously.

If re-transmission produces invalid data as determined at blocks 1101 and 1103, the NAK routine will be repeated again until the maximum NAK count is reached (path leading from block 1103 to block 1113). Once this occurs, the controller will send a reset command to the NAK'd address (block 1123 et seq., to be described below) and will then end the polling attempt (block 1133 or block 1139).

In summary, the ACK/NAK routine detailed above allows the controller as many chances as desired (in this embodiment, 3) to obtain data from a polled scanner if the controller detects errors in the form, format or transmission of that data. The ACK/NAK routine also provides a means to reset the polled scanner if a reasonable number of attempts fails to produce a good data transmission.

The "Send Reset" routine shown in blocks 1115–1139 will now be discussed. This routine commences at block 1115 when the controller encounters communication errors or when the maximum no reply count described in any of FIGS. 8–11 has been reached. When entered, this routine causes the controller to send a reset command to the polled address to determine if that address is still capable of transmitting the proper reset acknowledgment reply over the network (block 1123). If the controller receives the proper reply, the Y branches from blocks 1127 and 1129 are followed, signifying the fact that the controller considers the address still worth polling. In this case, the controller resets all accumulated error status (block 1131). The controller then ends the poll of that address (block 1133).

If the controller receives no reply N branch from block 1127 to block 1125) or if the reply is invalid (N branch from block 1129 to block 1125, the controller increments its reset error count. At block 1135, the controller then checks to see if this count has reached its maximum value (in this embodiment, 3). If this count has not, the N path leading to block 1139 is followed, where the poll of the address ends. If the maximum value has been reached, however, the Y path from block 1135 leads to block 1137, whereupon the controller then considers the polled address to be experiencing continuing communication problems which do not warrant continued active polling. The controller will then change the status of the polled address from active to standby, thereby temporarily eliminating this address and its associated communication problems from the network. However, this address will be rechecked by the controller at a later moment in time, as already described in connection with FIG. 9.

It is to be clearly understood that the No Reply, Reset Error Acknowledgment and NAK count values detailed in conjunction with FIGS. 8–12 are given as illustrative examples only. If desired, any or all of these counts can be adjusted to other values to meet the requirements of specific system applications. Such adjustments are within the spirit and scope of the invention Referring now to FIGS. 12 and 13, the network communication protocol executed by the scanner will be explained in detail. This protocol is relatively simple, so as to allow for fast execution. On the other hand, the protocol is sufficiently flexible so as to relax the requirements of the network controller. More specifically, the network controller may be equipped to provide network communications using simple and/or complex error handling methods.

Figure 12:
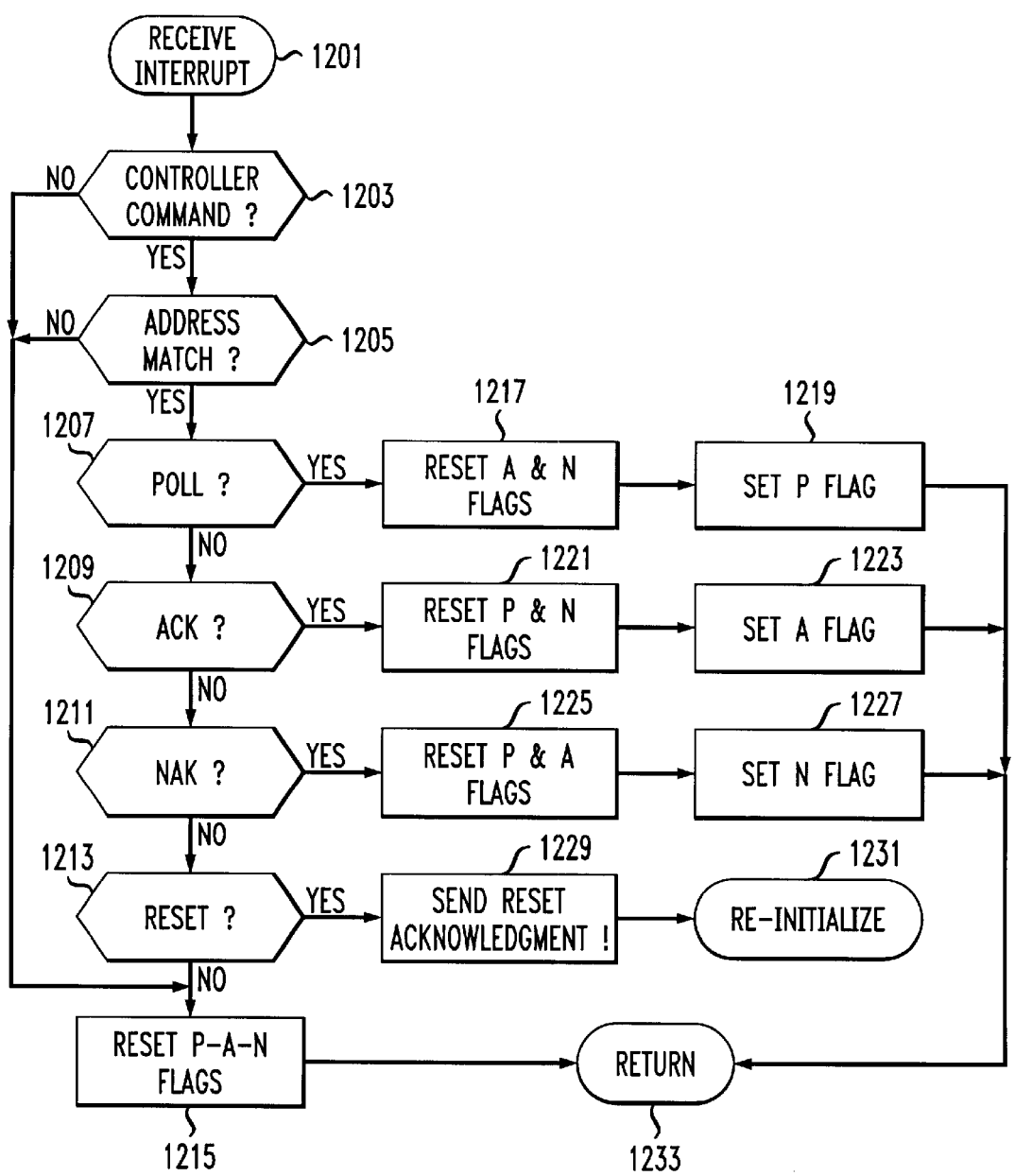
FIG. 12 is a flowchart setting forth the manner in which network communications are received by the scanner.

FIG. 12 is a flowchart setting forth the manner in which network communications are received by the scanner. This routine is executed on an "interrupt" basis (block 1201) which forces the scanner to immediately interrupt what it is doing and evaluate the received data byte for form and/or content. After this evaluation is completed, the results of this form and/or content evaluation are stored in the form of a "command" flag which allows the scanner to process the received command at a later time. The one exception to this is the reset command which is acknowledged and processed immediately. The simple protocol of this embodiment requires only six tests to detect and handle a network controller command.

The first test performed on any received data is to see if it is a command byte sent by the controller (block 1203). Actually, pursuant to the present illustrative example, this command byte is the only thing that the scanner should be interested in receiving. In this simplified protocol, all controller command bytes have their most significant bits (MSBs) set to 1's, so it is this MSB bit that is checked first by the routine. If this bit is not set, the N path is followed to block 1215, where further evaluation stops and the received byte is discarded. The scanner now knows that the network is busy with other communications, so the routine resets all the receiver "command" flags (which will be discussed in detail later) to prevent any response from the scanner at this time. The scanner then resumes whatever operation it was performing prior to the receiver interrupt by using the "return" path (block 1233).

If the scanner finds that the MSB is set to a 1, the Y path is followed from block 1203 to block 1205 where the scanner's processing mechanism then checks to see if the address of the command byte matches its own address. If it does not, the N path is followed to block 1215, and the scanner knows that the communication was intended for another unit. Accordingly, the scanner discards the command byte, resets all receiver flags and uses the return path as before (block 1233) to end the receiver interrogation. If the address of the command byte matches the address of the scanner, the Y path leads to block 1207, where the scanner must determine what type of command the controller is sending it. To determine this, the scanner first tests the command byte to see if the controller has sent it a POLL command (block 1207). If so, the Y path leads to block 1217, where the scanner resets any previously set but unprocessed command flag and then sets the P (Poll) flag (block 1219). The scanner then ends the routine by using the interrupt return path previously discussed (block 1233).

If the command received was not a poll, the N path from block 1207 is followed to block 1209 where the scanner checks to see if the command is an ACK command. If so, the Y path to block 1221 is followed, where any unprocessed command flag is again reset and only the A (ACK) flag is set (block 1223). Then the receive interrupt routine terminates via the interrupt return path (block 1233). If the command received was not an ACK, (N path from block 1209 to block 1211), the scanner then checks to see if it is a NAK command. If this is the case, (Y path from block 1211 to block 1225), any unprocessed command flag is again reset and only the N (NAK) flag is set (block 1227). Then the receive interrupt routine terminates as before (block 1233). If the command is not a NAK, (N path from block 1211 to block 1213), the last check the scanner makes is to see if a RESET command has been sent. If so, the scanner sends a reset acknowledgment reply to the controller (block 1229) and then proceeds to re-initialize itself (block 1231), discarding any stored data and flags in the process.

If, in the final test, the scanner determines that a RESET command has not been received, the N path from block 1213 to block 1215 is followed. The scanner concludes that some sort of error in the command evaluation process has occurred (which is highly unlikely). The scanner then resets all flags, discarding the command byte completely, and using the return path again to end the receiver interrogation (block 1233).

In summary, the routine of FIG. 12 allows a scanner to quickly determine if the controller has sent it a command and if so, what that command was. Once determined, the final result is either an immediate reset of the scanner or the setting of a single command flag signifying which controller command was last received by the scanner. The command flags are subsequently used by the scanner's "transmit" routine shown in FIG. 13 which will now be discussed.

Figure 13:
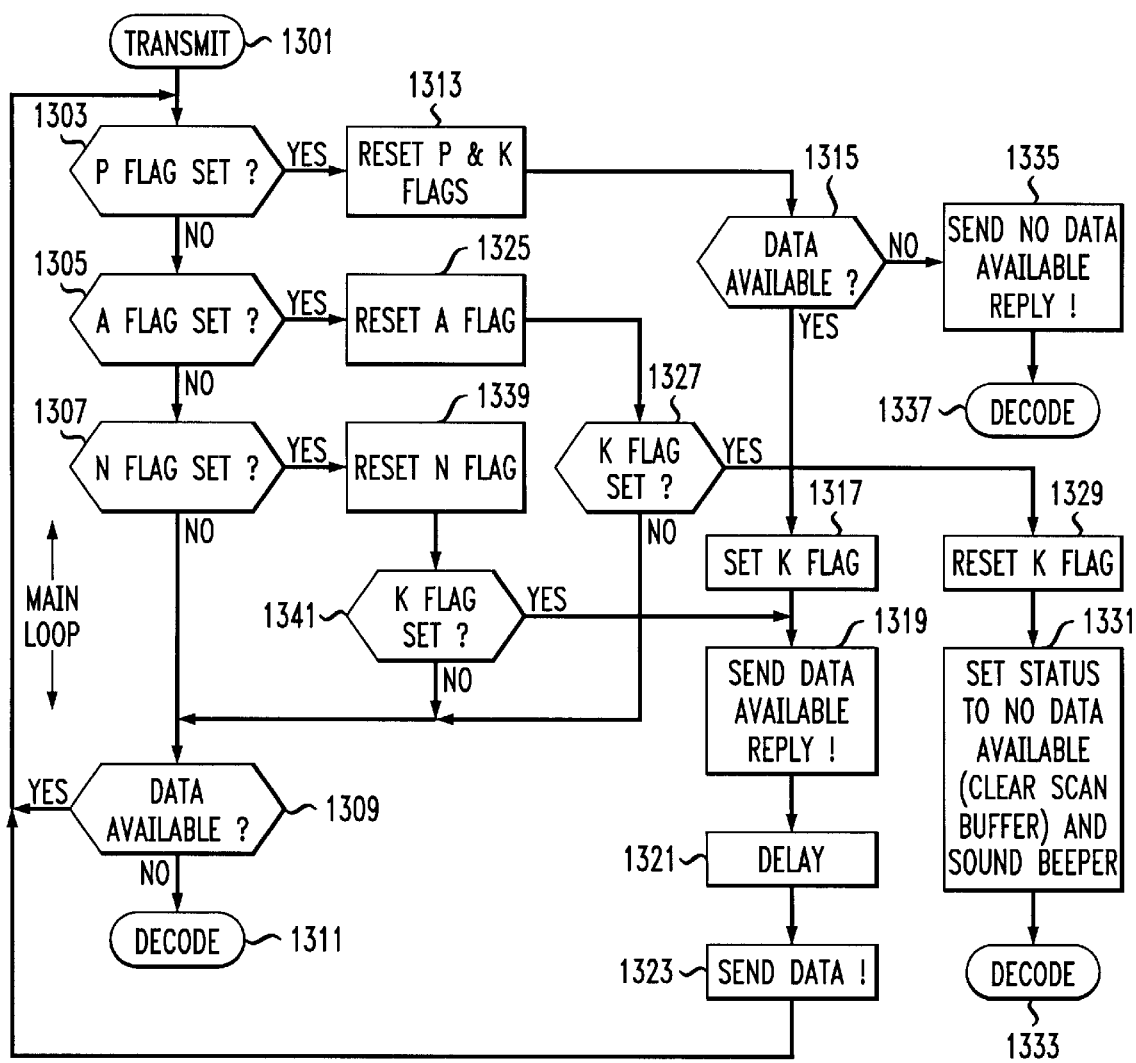
FIG. 13 is a flowchart setting forth a sequence of operations by which the scanner responds to a controller command.

Referring now to FIG. 13, the transmit routine allows a scanner to determine if any controller command is pending and if so, to take the appropriate action in response to whatever command had been received. In a typical sequence of events, the routine of FIG. 13 would most likely be entered (block 1301) after the scanner has acquired bar code label data to transmit. However, the transmit routine could also be entered by the scanner periodically, as time permits, in order to keep up with network controller polling. The main loop of the transmit routine sequentially checks the status of the P (Poll), A (ACK), and N YAK) command flags at blocks 1303, 1305, and 1307, respectively, to see if one of them was set by the receive interrupt routine of FIG. 12. If a flag is found to be set, a Y path is followed from block 1303, 1305, or 1307, respectively, to corresponding blocks 1313, 1325, and 1339, where the corresponding routine associated with a respective set flag is executed as detailed below.

If all flags are found reset, (N path for each of the tests at blocks 1303, 1305, and 1307), the scanner checks to see if it has any data available to transmit (block 1309). If not, the N path to block 1311 is followed where the routine exits. The scanner then returns to the task of trying to acquire scanned data by re-entering a routine that provides for the decoding of bar code data (block 1311). If data are available at block 1309, the Y path is followed back to block 1303 where the scanner returns to the beginning of the routine and continues testing the status of the command flags repeatedly, waiting for any one or more of them to be set by the receive interrupt routine.

With reference to block 1303, the first test the routine performs is to see if the P flag is set. If so, the Y path leads to block 1313, and the scanner knows that the controller has sent it a POLL command. After resetting the P and K flags, the scanner then checks to see if it has any data available to send to the controller (block 1315). If not, the N path leads to block 1335, where the scanner sends the controller a "no data available" reply and then terminates the transmit routine by returning to the aforementioned decode routine (block 1337). If data are available, the Y path is followed from block 1315 to block 1317, where the scanner sets its K flag. This flag tells the scanner that it can now expect either an ACK or a NAK command from the controller in response to the data the scanner is about to send. The next operation the scanner performs is to send the controller a "data available" reply (block 1319). The scanner will then wait for a short period of time (block 1321) to allow the data available reply to be received and understood by the controller. After this short delay, the scanner will send whatever data it has to the controller (block 1323), but will maintain that data in its memory until it receives an ACK command from the controller acknowledging the transmission. After sending the data, the scanner returns to the main loop of the transmit routine (block 1303) and begins to continuously look for a new controller command (the occurrence of a new flag). The scanner does this because it still has data available, and this effectively forces the routine to take the Y path each time it encounters the data available test at block 1309 (or possibly block 1315).

The second test performed by the main loop of the transmit routine is to see if the A flag is set (block 1305). If so, the Y path leads to block 1325, where the scanner determines that the controller has sent it an ACK command. After resetting the A flag (block 1325), the scanner then checks to see if its K flag is set (block 1327). If so, the scanner determines that the controller is responding to a previous data transmission sent to it by the scanner and that the controller has received the data correctly. The K flag is then reset (block 1329) and the scanner proceeds to set its status to "no data available" (block 1331) and to discard the data stored in its scan buffer. The scanner then sounds its audible beeper to signal the scanner operator that the scanning operation has been successfully completed. After that, the scanner exits the transmit routine and returns to its decode routine to look for new scan data (block 1333). If, on the other hand, an ACK was received at block 1305 and the K flag was not set when tested at block 1327, the scanner determines this to be an error condition due to the fact that the scanner had received an ACK when none was expected. The scanner then discards the received ACK and returns to the main loop of the transmit routine (block 1309) to check if it has data available to transmit. Based on this test, the scanner will either leave the routine, N path to block 1311), or remain in the routine, (Y path to block 1303) to look for another controller command (flag.

The third test performed by the main loop of the transmit routine is to see if the N flag is set (block 1307). If so, the program advances along the Y path to block 1339, where the scanner determines that the controller has sent it a NAK command. After resetting the N flag (block 1339), the scanner then checks to see if its K flag is set (block 1341). If the K flag is set, the scanner determines that the controller is responding to a previous data transmission sent to it by the scanner, and that the controller has not received the data correctly. The scanner then proceeds to retransmit the previously-sent data in the same manner as it did when originally polled (blocks 1319, 1321, and 1323). Since the K flag is still set, the scanner will still be expecting an ACK or NAK reply from the controller after this retransmission. Since the scanner still has data available, it will continue to look for that ACK or NAK (or another POLL) when it returns from block 1323 to the main loop of the transmit routine (block 1303) after the retransmission completes. If, on the other hand, a NAK was received and the K flag was not set when tested at block 1341, the scanner would consider this to be another error condition since it had received an unexpected NAK. The scanner then discards this NAK and returns to the main loop of the transmit routine to see if it has data available to transmit (block 1309). Again, based on this test, the scanner will either leave the routine, (N path to block 1311), or remain in it, C path to block 1303), to look for another controller command (flag). In summary, then, FIG. 13 shows the manner in which the scanner responds to a controller command.

The preceding flowcharts describe basic illustrative operational sequences and communication protocols which may be employed to implement the invention, However, it will be understood and appreciated by those skilled in the art that many variations of these operational sequences and protocols are possible, and such variations are within the spirit and scope of the invention. By way of example, one possible variation on the basic protocol described above would be to use address zero as a "broadcast" address. This would permit the network controller to address all scanners on the network at once. This would be useful if the controller had to quickly send a global, system-wide command to all scanners, such as a reset command. Moreover, a higher-performance protocol can be implemented by activating the multi-processor asynchronous communications mode available in many popular micro-controllers. This mode is available, for example, on microcontrollers such as Intel 8031's and its derivatives, as well as National Semiconductor's HPC 16083 and its derivatives. In this mode of operation, a 9-bit asynchronous word is used, with the 9th, most significant data bit serving as the address byte identifiers. Here, the micro-controller hardware can be configured to only interrupt micro-controller processing when such an address byte has been received. This reduces the number of interrupts that the decoder must process while looking for bar code data. The single byte address/command frame can still be used in this environment, with the micro-controller firmware masking out the command bits to determine if the poll address is intended for that device. This mode places additional demands on the controller software/hardware, in that it requires such software/hardware be equipped for supporting 9-data-bit, asynchronous words, hence not very attractive for some systems whose multipoint hardware is limited to 8 data bits. In this case, the controller function could be implemented by a scanner manufacturer-supplied device.

A still higher performance protocol can be implemented by using a multibyte address/command sequence. This would allow scanners equipped with more advanced micro-controllers, such as the Dallas Semiconductor DS80C320, to load up a fixed slave address register for the hardware, against which received data are matched. The decoding processor is only interrupted when the hardware finds an exact match against that scanner's address.

In addition to the basic address byte sizes, (8 versus 9 data bits and 1 versus multibyte address/command sequences), the protocol could utilize optional error detect protocols, scaled via a firmware configuration, to use no-error checking, Longitudinal Redundancy Checks (LRC's), or Cyclic Redundancy Checks (CRC's) as desired, depending upon environmental and system demands at a given site.

Without further elaboration, the foregoing hardware and software descriptions will so fully illustrate the invention that others may, by applying current or future knowledge, readily adapt the same for use under various conditions of service.

We claim:

1. A data communications network adapted to gather data from any of a plurality of bar code scanners, the network including:

a network controller for controlling uploading of data from any of the plurality of bar code scanners coupled to the data communications network; the network controller including a first processing mechanism;

a plurality of network interface ports that are not equipped with a processing mechanism, each port being coupled to the network controller, and each network interface port adapted for connection to a bar code scanner.

2. A data communications network adapted to gather data from any of a plurality of bar code scanners, the network including:

a network controller for controlling uploading of data from any of the plurality of bar code scanners coupled to the data communications network; the network controller including a first processing mechanism;

a plurality of network interface ports that are not equipped with a processing mechanism, each port being coupled to the network controller, and each network interface port adapted for connection to a bar code scanner equipped to generate a first data signal suitable for transmission over a relatively short distance, and the bar code scanner further including a data transmission converter adapted to convert the first data signal into a second data signal suitable for transmission over a relatively long distance, and the second data signal is provided at the data communications network interface.

3. The data communications network of claim 2 wherein the network controller includes a microcontroller coupled to a memory device and a network interfacing mechanism adapted to communicate over the data communications network.

4. The data communications network of claim 3 wherein the network controller further includes a host device interfacing mechanism for interfacing with at least one host device.

5. The data communications network of claim 4 wherein the host device is adapted to initiate a gathering of data from at least one bar code scanner coupled to the data communications network.

* * * * *